July 7, 1925.

W. T. SEARS

PROCESS OF GENERATING GEARS

Filed Sept. 23, 1921

1,545,070

Patented July 7, 1925.

1,545,070

UNITED STATES PATENT OFFICE.

WILLARD T. SEARS, OF MONTCLAIR, NEW JERSEY, ASSIGNOR TO NILES-BEMENT-POND COMPANY, OF NEW YORK, N. Y., A CORPORATION OF NEW JERSEY.

PROCESS OF GENERATING GEARS.

Application filed September 23, 1921. Serial No. 502,716.

*To all whom it may concern:*

Be it known that I, WILLARD T. SEARS, a citizen of the United States, residing at Montclair, in the county of Essex and State of New Jersey, have invented certain new and useful Improvements in Processes of Generating Gears, of which the following is a specification.

This invention relates to a process of generating gears by the action of milling cutters.

An object of the invention is to provide a method of rapidly generating the tooth curves of a gear by means of straight sided milling cutters, the opposite cutting surfaces of which are inclined relatively to each other to correspond to the angle formed by the teeth of a rack.

Another object of the invention is to provide a method of generating gears which will permit the cutter to operate at the full depth of the gear teeth being cut, and repeated actions of the cutters will cut away the tooth flanks to correspond accurately with a generated involute tooth curve.

With these and other objects in view, my invention consists in the steps of the process set forth in the following specification which may be carried out in the machine shown in the accompanying drawing.

In the accompanying drawing annexed hereto and forming a part of this specification, I have illustrated the process of generating a spur gear according to the present invention but it will be understood that the invention can be otherwise carried out and that the drawing is not to be construed as defining or limiting the scope of the invention, the claims appended to this specification being relied upon for that purpose.

In the drawing:

Figure 1 is a plan view of a milling machine with a gear in position for the preliminary cutting of the teeth.

Figs. 2 and 3 show diagrammatic views of a gear and the cutters after a number of passages of the milling cutter have been taken.

In the above mentioned drawing, I have shown but one embodiment of a machine for carrying out the invention which is now deemed preferable but it is to be understood that changes and modifications of the process may be made within the scope of the claims without departing from the spirit of the invention.

Briefly, my invention in its broadest aspect may be carried out in a milling machine having the following principal parts; first, a base; second, a tool support thereon adapted to support a plurality of straight sided milling cutters adapted to be moved past a gear; and third, a rotating and reciprocating table adapted to support a gear. The process comprises broadly the following steps; first, cutting the gear to the full depth of the teeth, each tooth being so cut before any teeth are cut a second time; second, in effect, rolling the gear in front of the cutters, and again cutting each tooth with the cutters adjusted to cut to full depth of the teeth; and third, repeating the cutting of each tooth of the gear after each of the several similar rolling movements of the gear in the same direction until the complete outline of the gear has been generated.

A machine by means of which the present process may be carried out may comprise a base 10, having a saddle 11 mounted at one end adapted to be moved on ways 12 provided on the base 10. The saddle 11 is provided on its upper surface with ways 13 extending at right angles to the ways 12 upon which it slides. Mounted on the saddle 11 is a reciprocatory work support 15 which may be moved laterally on the ways 13 by any suitable means. The support 15 is provided centrally with a rotatable table 16 which may be rotated simultaneously with reciprocations of the support 15. The particular mechanism of compound work support shown in the drawing is that shown and described in patent to Maag, 1,290,270. As described in said patent, the table 16 may be rotated by a worm 17 engaging a worm wheel provided as a part of the table 16. Worm 17 is slidable along its operating shaft 18 so that movement of the support 15 laterally will not effect its driving connection. The lateral movement of the support 15 is preferably obtained by means of a screw 19. Another screw of increased pitch 20 frictionally driven thereby may also be used to prevent errors due to lost motion. The screw 20 serves to continuously hold the table 15 as far as permitted by the screw 19. By means of this screw 20, all lost motion between the teeth of the screw 19 and those with which they engage on the table 15 is held constantly on one side, and thus the table 15 is prevented from moving due to looseness between the threads. As the above parts are similar to those found in the above mentioned patent, further description is thought to be unnecessary, suffice it to say that rotation of the shaft 18 and screw 19 by gears 21 and 22 respectively in amounts dependent on the size and number of teeth in the particular gear being cut will simulate a rolling movement of the gear blank upon its pitch cylinder past the cutters.

In carrying out my present invention, I mount a gear blank A on the rotating table 16. The cutters 24 used in this process comprise milling cutters of the form shown, a plurality of which are mounted on a tool holding arbor 25 and so adjusted relative to each other that the cutting surfaces take the positions of the flanks of a rack of the pitch desired to be cut, and, in the involute system of gearing, are straight sided and approximately $14\frac{1}{2}°$ from a line normal to the axis of the cutters.

The tool holding arbor is mounted on a slide 26 which may, in the embodiment of the invention illustrated, move in a plane parallel to the axis of the rotating table 16. Any means may be used for slowly reciprocating the slide 26 past the face of the gear A, and the cutter arbor 25 may be rotated as by means of the gearing 27 and shaft 28. With the gear A mounted on the rotating table 16 and the cutters 24 adjusted as shown in Fig. 1, the cutters 24 may be passed across the face of the gear A at full depth of the teeth to be cut so that the teeth of the gear will be cut to their maximum depth on the first passage of the tool, but, due to the sides of the cutter, they will not have a characteristic involute form.

Between each passage of the cutters 24 past the face of the gear A, I rotate it through an arc equivalent to the pitch of one tooth and again pass the cutters 24 across the face of the gear. This process is repeated until the gear being operated on has been rotated through a complete revolution, one tooth at a time, and each of the gear teeth has been roughly shaped but has straight portioned sides conforming only roughly to the outline of a gear tooth.

After the gear A has completed one revolution and the milling cutters 24 have roughly cut the outline of each tooth, I rotate the table 16 slightly and also move the slide 15 on which it is mounted so that, in effect, a rolling action between the gear A and the cutters 24 takes place as if the gear A were rolled a short distance upon a plane passed through the cutter parallel to the axis of the gear. This movement of the slide or support 15 and table 16 is accomplished by rotation simultaneously of the screw 19 and the shaft 18 which may be controlled and varied by means of change gearing with which the gears 21 and 22 are associated. After this rolling movement of the gear A has been completed I pass the cutters 24 again through the same spaces as before, but, as the relative position of the cutting surfaces and the gear A has been changed, a different part of the tooth outline will be cut away by the flanks of the cutters 24. After completing another revolution of the gear in steps of one tooth at a time with the table and slide thus adjusted, these parts are again adjusted to simulate a further short rolling action between the gear A and cutters 24 and the milling operations are again repeated in the same manner as before. This re-positioning of the gear A between milling operations is repeated until the gear has been moved through the distance of one pitch at which time the complete tooth curves will have been generated by the milling cutters and the tooth curves will be completely formed.

As many re-positioning movements of the gear may be used as found desirable. The larger number of these positioning movements that are given the gear between operations of the milling cutters will more accurately simulate a true generated tooth curve on the gear. Figs. 2 and 3 diagrammatically represent two of the positions of the gear blank A relative to the cutter 24, during the milling operation. In Fig. 2, the gear blank A has been moved a distance $a$ from the position as shown in Fig. 1, while Fig. 3 shows the gear blank A moved a distance $b$ corresponding almost to the circular pitch of the blank. Normally in practice the gear would be re-positioned for cutting a much larger number of times than the three shown in the figures of the drawing. Obviously, cutting may be done on the up as well as the down stroke of the cutters 24.

What I claim is:

1. The method of generating a gear comprising passing a plurality of rotatable milling cutters having straight sided flanks across the face of said gear, then rotating the gear an amount equal to one circular pitch, repeating said milling and rotating of said gear until the entire circumference of the gear has been gashed, then relatively moving the cutter and gear so that a rolling action of a rack and gear is simulated, and repeating the milling and rolling movements until the complete outline of the gear teeth has been generated.

2. The method of generating a gear comprising passing a plurality of rotatable milling cutters having straight side flanks across the face of said gear, then rotating the gear an amount equal to one circular pitch, repeating said milling and rotation of said gear until the entire circumference of the gear has been gashed, then rotating said gear and moving its axis laterally predetermined relative distances to simulate rolling of said gear relative to the rack formed by said cutters, and repeating the milling, rotating and rolling of said gear until the complete outline of the gear teeth has been generated.

3. The method of generating a gear comprising passing a plurality of rotatable milling cutters having straight sided flanks across the face of said gear, said gear being so positioned that the gear teeth are cut to their maximum depth, rotating the gear an amount equal to one circular pitch, repeating said milling and rotating until the entire circumference of the gear has been gashed, then rotating said gear and moving its axis laterally to simulate rolling of said gear relative to the rack formed by said cutters, and repeating the milling, rotating and rolling of said gear until the complete outline of the gear teeth has been generated.

4. The method of generating a gear comprising passing a plurality of rotatable milling cutters having cutting surfaces corresponding to the surfaces of a rack across the face of said gear, said gear being so positioned that the gear teeth are cut to their maximum depth, rotating the gear an amount equal to one circular pitch, repeating said milling and rotating until the entire circumference of the gear has been gashed, then rotating said gear and moving its axis laterally to simulate rolling of said gear relative to the rack formed by said cutters, and repeating the milling, rotating and rolling of said gear until the distance the gear has been rolled equals a circular pitch and the complete outline of the gear teeth has been generated.

In testimony whereof, I hereto affix my signature.

WILLARD T. SEARS.